Patented Aug. 24, 1954

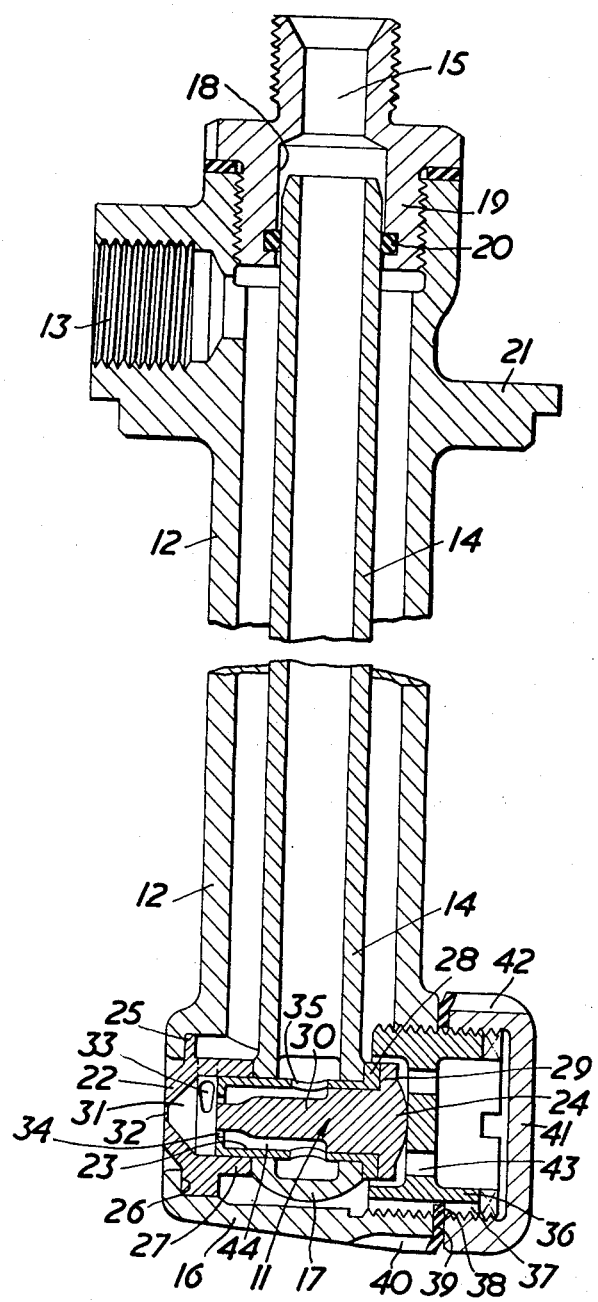

2,687,330

UNITED STATES PATENT OFFICE 2,687,330

SPILL BURNER UNIT FOR CONTINUOUS COMBUSTION TURBINE ENGINES

Alfred W. Pearce, Yate, near Bristol, England, assignor to Dowty Equipment Limited, Arle Court, Cheltenham, England Application June 25, 1952, Serial No. 295,428

Claims priority, application Great Britain June 29, 1951

6 Claims. (Cl. 299—120)

This invention relates to fuel atomizers for continuous combustion turbines. Each atomizer is arranged on the end of a fuel supply conduit which generally projects through the wall of a combustion chamber to mount the atomizer midway through the chamber. If the atomizer is directed downstream of the airflow through the chamber, the relatively cool air flows over the supply conduit in advance of the combustion zone. An alternative arrangement which finds favour is to direct the atomizing spray upstream of the airflow through the chamber, and in this case the supply conduit will be situated more in the combustion zone whereby the fuel in the supply conduit is pre-heated resulting in improved efficiency of combustion.

Again, a preferred type of atomizer for continuous combustion turbines is that known as a spill type atomizer in which the fuel is directed through tangential passages into a swirl chamber wherein the flow is divided, a proportion of the fuel being discharged thence through a discharge orifice and the remainder passing through a spill orifice into a return conduit.

One object of the present invention is to provide a unitary fuel atomizer device of the spill type suitable for installation in a combustion chamber for directing atomized spray upstream of the airflow through the chamber.

Another object is to provide an atomizer unit in accordance with the foregoing object wherein the return conduit is protected from high temperatures prevailing in the combustion chamber by surrounding it with the supply conduit and the fuel therein en route to the swirl chamber.

A further object is to provide an atomizer unit having a protected return conduit wherein thermal stresses acting between the supply and return conduits are eliminated.

The preferred form of spill burner unit constructed in accordance with the invention will now be described with reference to the accompanying drawing.

As shown, the unit comprises an atomizing burner head assembly indicated generally at 11, a supply conduit 12 leading to said head assembly from an inlet or supply connection 13, and a return conduit 14 leading from said head assembly to an outlet or spill connection 15. The conduits 12 and 14 are disposed concentrically about an axis which is transverse to (in the illustrated form at right angles to) the axis of the burner head assembly 11. The conduit 12 is formed with a tubular housing 16 for the burner head assembly, and the conduit 14 is formed at its corresponding end with a circularly enlarged fitting 17 disposed within the housing 16, and resembling the head of a banjo, hence termed herein a "banjo" fitting. The end of the conduit 14 remote from the burner head assembly 11 extends into an oversized bore 18 in an end fitting 19 which is screwed into the end of the outer conduit 12. A resilient packing ring 20 recessed into the bore 18 seals the conduits 12 and 14 from one another whilst permitting limited universal movement as well as sliding movement of the conduit 14 with respect to the conduit 12. The unit has a flange 21 remote from the burner head assembly and by means of which the unit may be secured to the boundary wall of a combustion chamber into which the conduits 12 and 14 extend.

The burner head assembly comprises three parts 22, 23 and 24 displaceable axially with respect to the housing 16. The part 22 has a flange 25 for engagement with an annular abutment surface 26 at one end of the housing 16. It also has a sleeve portion 27 the end of which bears directly against one side of the banjo fitting 17. The part 23 fits through the openings of the banjo fitting 17 and into the sleeve 27 of the part 22, and has a flange 28 the inner surface of which directly engages the other side of the banjo fitting 17. The part 24 has a flange 29 engaging the flange 28 of the part 23 and has a shaped stem portion 30 which extends thence by successively stepped reductions, within the part 23. The space 31 left between the part 22 and the adjacent ends of the parts 23 and 24 constitutes the swirl chamber of the burner head assembly, said swirl chamber having a discharge orifice 32 and tangential entry passages, of which one is indicated at 33, leading from the supply conduit 12. The part 23 has a completely uninterrupted annular spill orifice 34 and a spill chamber 44 into which extends in spaced relationship the end of the stem portion 30 of the part 24. It also has a number of ports 35 leading from the spill chamber 44 into the return conduit 14. The part 24 is clamped against the part 23, and the parts 22 and 23 are clamped against the banjo fitting 17, and all the parts are clamped as a whole against the annular abutment surface 26 by a screw member 36 screwed into the housing 16 at the opposite end thereof to the abutment surface 26.

From a consideration of the drawing it will be seen that all the relatively movable parts, i. e. the parts 22, 17, 23, 24 and 36 are each limited in their movement towards the annular abutment surface 26 by a single end surface, and that all such end surfaces are in turn located by the annular abutment surface 26. Slight differences that may exist between individual component parts of different sets of parts would in no way interfere with correct sealing engagement between the parts of any set when the latter is assembled. The need for employing compressible sealing washers is therefore entirely eliminated at that part of the unit which will be disposed within the combustion chamber and subjected to the high temperatures of combustion. The screw member 36 has a channel 37 into which is received a tongue 38 of a metal washer 39. The housing 16 has a notch 40 into which a part of the washer 39 is displaced to lock the member 36 against rotation with respect to the housing 16. The housing 16 is finally closed by a screw cap 41 screwed on to the member 36 against the washer 39. The cap 41 has a notch 42 into which part of the washer 39 is displaced to lock the cap against rotation relatively to the member 36. The member 36 has one or more ports 43 which communicate with the interior of the supply conduit 12 and which serve to prevent the entrapment of liquid between the member 36 and the cap 41.

In the preferred embodiment above described, the inner conduit 14 is made capable of limited universal movement with respect to the outer conduit 12 since it readily permits the banjo-fitting end of the inner conduit to move during clamping of the several burner head parts. The slidable sealing relationship between the inner conduit 14 and the end fitting 19 serves to eliminate any thermal stresses acting between the supply and return conduits 12 and 14. For example, the relative displacement between these conduits at the seal 20, as the conduit 12 heats up from cold to normal running, may be of the order of .02 inch, an amount which would be inadmissible if the conduits 12 and 14 were rigidly secured together at both ends.

I claim:

1. A spill burner unit comprising a rigid tubular supply conduit terminating at one end in a generally tubular atomizer housing, the axis whereof is directed transversely of the axis of the conduit, said housing being open at each end; a rigid return conduit separate from and disposed substantially coaxially within and spaced throughout its length from said supply conduit, to define an annular supply passage, and terminating within the atomizer housing as a banjo fitting coaxial with said housing; an assemblage of incompressible rigid parts coaxially arranged within said housing and in part within said banjo fitting and cooperating to space the banjo fitting from one end of the housing, and two of such parts cooperating to clamp the opposite sides of the banjo fitting and thus to hold it fixedly relative to such end; a closure means for the opposite end of the housing pressing against the assemblage to retain it and the interposed banjo fitting in assembled, liquid-tight clamped relationship within and relative to the housing; the several parts of said assemblage defining, within the assemblage and intermediate certain of the individual parts, a swirl chamber ported for communication with the supply passage, and to define an atomizing orifice located in the axis of the housing, and to define an axially disposed spill orifice at the opposite end of the swirl chamber; and a spill chamber to which the spill orifice leads and which is ported for communication with the return conduit, and resilient sealing means interposed between the spaced end portions of the supply and return conduits which are located remotely from the housing and banjo fitting, respectively, whereby the return conduit is free to move relative to the supply conduit, as during clamping of the banjo fitting.

2. A spill burner unit as in claim 1, wherein the resilient sealing means comprises a packing ring mounted captively in one of the conduits and slidably engaging the other conduit.

3. A spill burner unit comprising a rigid tubular supply conduit having means adjacent one end for supporting it, whereby its opposite end will project interiorly of a combustion chamber, and terminating at such interior end in a generally tubular atomizer housing, the axis whereof is directed transversely of the axis of the conduit, said housing being open at each end; a rigid return conduit separate from and disposed substantially coaxially within, and spaced throughout its length from, said supply conduit, to define between the two conduits an annular supply passage, and terminating within the atomizer housing as a banjo fitting coaxial with said housing; an assemblage comprising a plurality of incompressible, rigid parts coaxially arranged within and slidable axially relative to one another and to said housing, and located in part within said banjo fitting and in part intermediate the respective ends of the housing and the banjo fitting, one of the parts of said assemblage seating against one end of the housing and against the facing end of said banjo fitting as a spacer element to maintain them separated, and a second part of the assemblage seating against the opposite end of the banjo fitting and cooperating with the relatively slidable first part to clamp the banjo fitting between them; a closure means for that end of the housing which is opposite the spacer element, arranged to engage and press said second part of the assemblage towards said spacer element, to retain said assemblage and the banjo fitting in assembled, liquid-tight clamped relationship within and relative to the housing; the several parts of the assemblage defining, within the assemblage and intermediate certain of the individual parts, a swirl chamber ported for communication with the supply passage, an atomizing orifice leading thence and located in the spacer element at the housing's axis, a spill orifice at the opposite end of the swirl chamber, and a spill chamber to which the spill orifice leads and which is ported for communication with the return conduit; and resilient sealing means interposed between the spaced end portions of the supply and return conduits which are located remotely from the housing and banjo fitting, respectively, whereby during clamping of the banjo fitting or other movement of one conduit relative to the other, to leave such conduits free to move relatively.

4. A spill burner unit as in claim 3, wherein the housing is threaded and the closure means is complementally threaded, about the housing's axis, to press the second part of the assemblage towards the banjo fitting, the latter in turn against the spacer element, and the latter against its seat at the opposite end of the housing.

5. A spill burner as in claim 4, wherein the closure means is formed of two parts, one whereof is threadedly joined to the housing, the other of is threadedly joined to the first part, and means common to the two parts and interengaged with each thereof and with the housing to lock the closure member parts against accidental rotation.

6. A spill burner as in claim 3, wherein the assemblage includes a third part slidably received within the second part, both said parts being flanged at the closure end of the housing to clamp the second part's flange between the third part's flange and the housing, when the third part is pressed by the closure means.

References Cited in the file of this patent

UNITED STATES PATENTS

| Number | Name | Date |
|---|---|---|
| 2,177,781 | Haynes | Oct. 31, 1939 |
| 2,354,842 | Spence | Aug. 1, 1944 |
| 2,613,997 | Ball | Oct. 14, 1952 |